United States Patent
Okada et al.

(10) Patent No.: US 11,498,572 B2
(45) Date of Patent: Nov. 15, 2022

(54) VEHICLE CONTROL BASED ON CALCULATED INERTIA MOMENT OF VEHICLE WHEEL

(71) Applicant: SUBARU CORPORATION, Tokyo (JP)

(72) Inventors: Tomoyuki Okada, Tokyo (JP); Tsubasa Ono, Tokyo (JP); Satoshi Yoshizawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 105 days.

(21) Appl. No.: 16/745,711

(22) Filed: Jan. 17, 2020

(65) Prior Publication Data

US 2020/0269705 A1 Aug. 27, 2020

(30) Foreign Application Priority Data

Feb. 26, 2019 (JP) .............................. JP2019-032259

(51) Int. Cl.
*G01M 17/02* (2006.01)
*B60W 40/068* (2012.01)
(Continued)

(52) U.S. Cl.
CPC ...... *B60W 40/068* (2013.01); *G01M 17/0072* (2013.01); *G01M 17/022* (2013.01);
(Continued)

(58) Field of Classification Search
None
See application file for complete search history.

(56) References Cited

U.S. PATENT DOCUMENTS 7,963,158 B2 * 6/2011 Mizone .............. G01M 17/022
   73/146
9,618,416 B2 * 4/2017 Okada ................ G01M 17/021
(Continued)

FOREIGN PATENT DOCUMENTS

JP       4-331336 A    11/1992
JP      10-318862 A    12/1998
(Continued)

OTHER PUBLICATIONS

Vasiljevic et al., "Experimental Testing of a Traction Control System with On-Line Road Condition Estimation for Electric Vehicles", 21st Mediterranean Conference on Control and Automation, Jun. 25, 2013, pp. 296-302. (Year: 2013).*
(Continued)

*Primary Examiner* — Todd Melton
(74) *Attorney, Agent, or Firm* — Troutman Pepper Hamilton Sanders LLP

(57) ABSTRACT

A vehicle information calculation apparatus includes a motor torque acquisition unit, an angular acceleration acquisition unit, a contact force acquisition unit, and an inertia moment calculator. The motor torque acquisition unit acquires a torque of a motor that drives a vehicle. The angular acceleration acquisition unit acquires an angular acceleration of the motor. The contact force acquisition unit acquires a contact force of a wheel of the vehicle. The inertia moment calculator calculates an inertia moment of a rotating system of the vehicle including the wheel on the basis of the torque acquired by the motor torque acquisition unit, the angular acceleration acquired by the angular acceleration acquisition unit, the contact force acquired by the contact force acquisition unit, and a coefficient of friction between the wheel of the vehicle and a contact surface.

16 Claims, 5 Drawing Sheets

(51) Int. Cl.
*G01M 17/007* (2006.01)
*B60L 15/20* (2006.01)
(52) U.S. Cl.
CPC ....... *B60L 15/2045* (2013.01); *B60L 2220/46* (2013.01); *B60L 2240/64* (2013.01)

(56) References Cited

U.S. PATENT DOCUMENTS

| | | | |
|---|---|---|---|
| 10,962,445 B2* | 3/2021 | Pfeiffer | G01M 13/025 |
| 11,037,381 B2* | 6/2021 | Ikeda | G07C 5/0808 |
| 2013/0180324 A1 | 7/2013 | Sota et al. | |
| 2014/0244186 A1* | 8/2014 | El Tannoury | G01L 17/00 |
| | | | 702/41 |

FOREIGN PATENT DOCUMENTS

| | | |
|---|---|---|
| JP | 2011191151 A | 9/2011 |
| JP | 2012-81873 A | 4/2012 |

OTHER PUBLICATIONS

Japanese Office Action dated Sep. 20, 2022 in Application No. JP2019-032559; with English Machine Translation.

* cited by examiner

VEHICLE CONTROL BASED ON CALCULATED INERTIA MOMENT OF VEHICLE WHEEL

CROSS-REFERENCE TO RELATED APPLICATIONS

The present application claims priority from Japanese Patent Application No. 2019-032259 filed on Feb. 26, 2019, the entire contents of which are hereby incorporated by reference.

BACKGROUND

The disclosure relates to a vehicle information calculation apparatus, a vehicle information calculation method, and a vehicle control apparatus.

An inertia moment of a rotating system including wheels is information useful for controlling behavior of a vehicle. Japanese Unexamined Patent Application Publication (JP-A) No. 2012-081873 discloses a technology that grasps an inertia moment or an outside inertia moment, in a specific but non-limiting example, of each of tires. The technology extracts a resonant frequency and an anti-resonant frequency of each of the tires to acquire a torsional spring constant and an outside inertia moment of each of the tires, making it possible to detect a state of each of the tires on the basis of the acquired information.

SUMMARY

An aspect of the disclosure provides a vehicle information calculation apparatus. The vehicle information calculation apparatus includes a motor torque acquisition unit, an angular acceleration acquisition unit, a contact force acquisition unit, and an inertia moment calculator. The motor torque acquisition unit is configured to acquire a torque of a motor that drives a vehicle. The angular acceleration acquisition unit is configured to acquire an angular acceleration of the motor. The contact force acquisition unit is configured to acquire a contact force of a wheel of the vehicle. The inertia moment calculator is configured to calculate an inertia moment of a rotating system of the vehicle including the wheel on the basis of the torque acquired by the motor torque acquisition unit, the angular acceleration acquired by the angular acceleration acquisition unit, the contact force acquired by the contact force acquisition unit, and a coefficient of friction between the wheel of the vehicle and a contact surface.

An aspect of the disclosure provides a vehicle information calculation method. The vehicle information calculation method includes acquiring a torque of a motor that drives a vehicle, acquiring an angular acceleration of the motor, acquiring a contact force of a wheel of the vehicle, and calculating an inertia moment of a rotating system including the wheel on the basis of the torque of the motor, the angular acceleration of the motor, the contact force of the wheel, and a coefficient of friction between the wheel of the vehicle and a contact surface.

An aspect of the disclosure provides a vehicle control apparatus. The vehicle control apparatus is to be provided in a vehicle including a motor as a drive source. The vehicle control apparatus includes a storage and a controller. The storage includes an inertia moment of a rotating system stored therein. The rotating system includes a wheel to be driven by the motor. The controller is configured to control behavior of the vehicle on the basis of the inertia moment stored in the storage. The inertia moment has a value calculated on the basis of a torque of the motor, an angular acceleration of the motor, a contact force of the wheel, and a coefficient of friction between the wheel and a contact surface.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
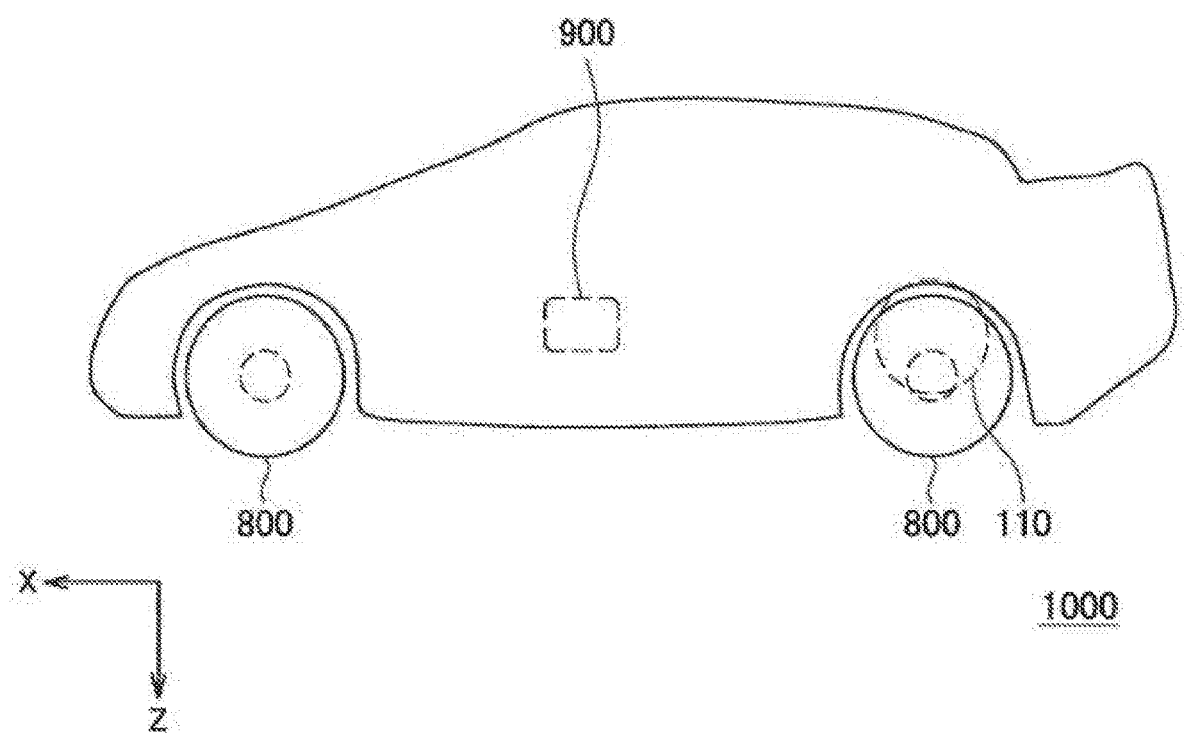
FIG. 1 is a schematic diagram illustrating an outline configuration of a vehicle according to one example embodiment of the disclosure.

In the following, some example embodiments of the disclosure are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

With reference to FIG. 1, an outline configuration of a vehicle 1000 according to an example embodiment of the disclosure will now first be described. As illustrated in FIG. 1, the vehicle 1000 may include a motor generator 110, tires 800 and wheels, and a control apparatus 900. The control apparatus 900 may be an apparatus that controls overall behavior of the vehicle 1000. The control apparatus 900 may control a driving force of the vehicle 1000, for example. Among front wheels and rear wheels, the example embodiment may use the rear wheels as driving wheels. A torque generated by the motor generator 110 may be transmitted to the rear wheels via a power transmission route to rotate the rear wheels. The power transmission route is not illustrated in the drawings. Wheels that receive a torque of the motor generator 110, i.e., driving wheels, may not be limited to the rear wheels, but may be the front wheels or all of the front wheels and the rear wheels.

Figure 2:
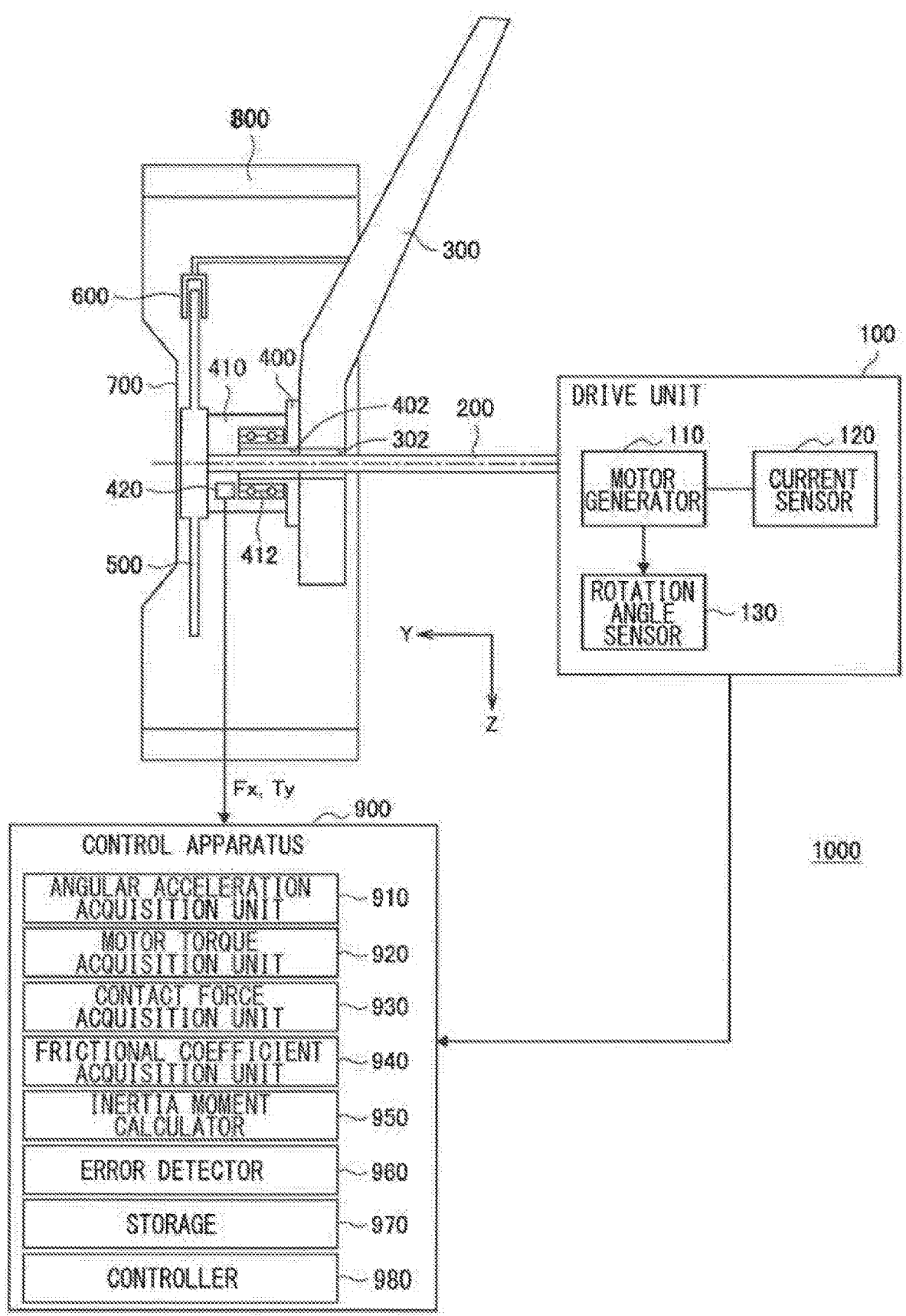
FIG. 2 is a schematic diagram illustrating a peripheral configuration of one of tires of the vehicle.

FIG. 2 is a schematic diagram illustrating a peripheral configuration of one of the tires 800 of the vehicle 1000. As illustrated in FIG. 2, the vehicle 1000 may include a drive unit 100, a drive shaft 200, an upright 300, a hub 400 on a body side, a hub 410 on a tire side, a bearing 412, a brake disk 500, a brake caliper 600, a wheel 700, the tire 800, and the control apparatus 900. FIG. 2 illustrates a state where the tire 800 and its peripheral mechanical components including the hubs 400 and 410 and the drive shaft 200, for example, are viewed from front of the vehicle.

The drive unit 100 may include the motor generator 110, a current sensor 120, and a rotation angle sensor 130. A torque of the motor generator 110 may be transmitted to the tire 800 via the drive shaft 200. The drive shaft 200 may constitute a portion of the power transmission route of the vehicle 1000. The portion may range from the motor generator 110 to one of the driving wheels. In the example embodiment, the one of the driving wheels may be one of the rear wheels. Travel resistance transmitted from a road surface to the tire 800 may be transmitted, as a regenerative driving force, from the tire 800 to the motor generator 110. Note that, in addition to the motor generator 110, the drive unit 100 may include a speed reducer that decelerates rotation of the motor generator 110 and transmits the decelerated rotation to the drive shaft 200.

In FIG. 2, the hub 400 on the body side may be fixed to the upright 300. The hub 410 on the tire side may be rotatable with respect to the hub 400 on the body side via the bearing 412. The brake disk 500 may be fixed with respect to the hub 410 on the tire side. The wheel 700 may be fixed with respect to the hub 410 on the tire side or the brake disk 500. The tire 800 may be attached to an outer circumference of the wheel 700.

The drive shaft 200 may pass through a hole 302 provided on the upright 300. The drive shaft 200 may further pass through a hole 402 on the hub 400. The drive shaft 200 may thus be coupled to the hub 410. A gap may be provided between the drive shaft 200 and the hole 302 on the upright 300. A gap may further be provided between the drive shaft 200 and the hole 402 on the hub 400. Without being interfered with the upright 300 or the hub 400, rotation of the drive shaft 200 may thus be transmitted to the hub 410.

The brake caliper 600 may be fixed to a fixing member on a vehicle body side, such as the upright 300. The brake caliper 600 may brake the brake disk 500 in accordance with operation of a brake pedal by a driver or an operator of the vehicle. The vehicle may be braked accordingly in a friction brake manner.

The hub 410 may be provided with a detector 420. The detector 420 may detect an acting force acting on the tire 800. An acting force detected by the detector 420 may include component forces in three directions, i.e., a longitudinal force Fx, a lateral force Fy, and a vertical force Fz. The acting force detected by the detector 420 may further include a torque Ty about an axis of the hub 410 or an axle. The longitudinal force Fx may be, among frictional forces occurring on a contact surface (or grounding surface) of the tire 800, a component force occurring in a direction parallel to a wheel center plane, i.e., x axis. The lateral force Fy may be, among the frictional forces described above, a component force occurring in a direction perpendicular to the wheel center plane, i.e., y axis. The vertical force Fz may be a force acting in a vertical direction, i.e., z axis. That is, the vertical force Fz may be a vertical load. The torque Ty may be a torque or a torsional force about the axle for the tire 800.

For example, the detector 420 may include a strain gauge and a signal processing circuit. The signal processing circuit may process an electric signal output from the strain gauge to generate a detection signal in accordance with an acting force. On the basis of knowledge that stress occurring on the hub 410 is proportional to an acting force, the strain gauge may be buried in the hub 410 to directly detect an acting force. Note that a configuration itself of the detector 420 is known, as seen in JP-A Nos. H04-331336 and H10-318862, for example. Its detailed description is thus omitted. The detector 420 may be provided to the drive shaft 200.

As illustrated in FIG. 2, the control apparatus 900 may include, as a configuration regarding calculation of an inertia moment I, an angular acceleration acquisition unit 910, a motor torque acquisition unit 920, a contact force (or grounding force) acquisition unit 930, a frictional coefficient acquisition unit 940, an inertia moment calculator 950, an error detector 960, and a storage 970. The control apparatus 900 may further include a controller 980 configured to read the inertia moment I stored in the storage 970. FIG. 2 illustrates the configuration of the control apparatus 900 as a functional module. The control apparatus 900 may however physically include a hardware configuration, i.e., a circuit, including a central processing unit (CPU), various storage apparatuses such as a read only memory (ROM) and a random access memory (RAM), and an input-output interface, for example. The control apparatus 900 may further be installed with a program or software that allows the hardware configuration to operate.

Figure 3:
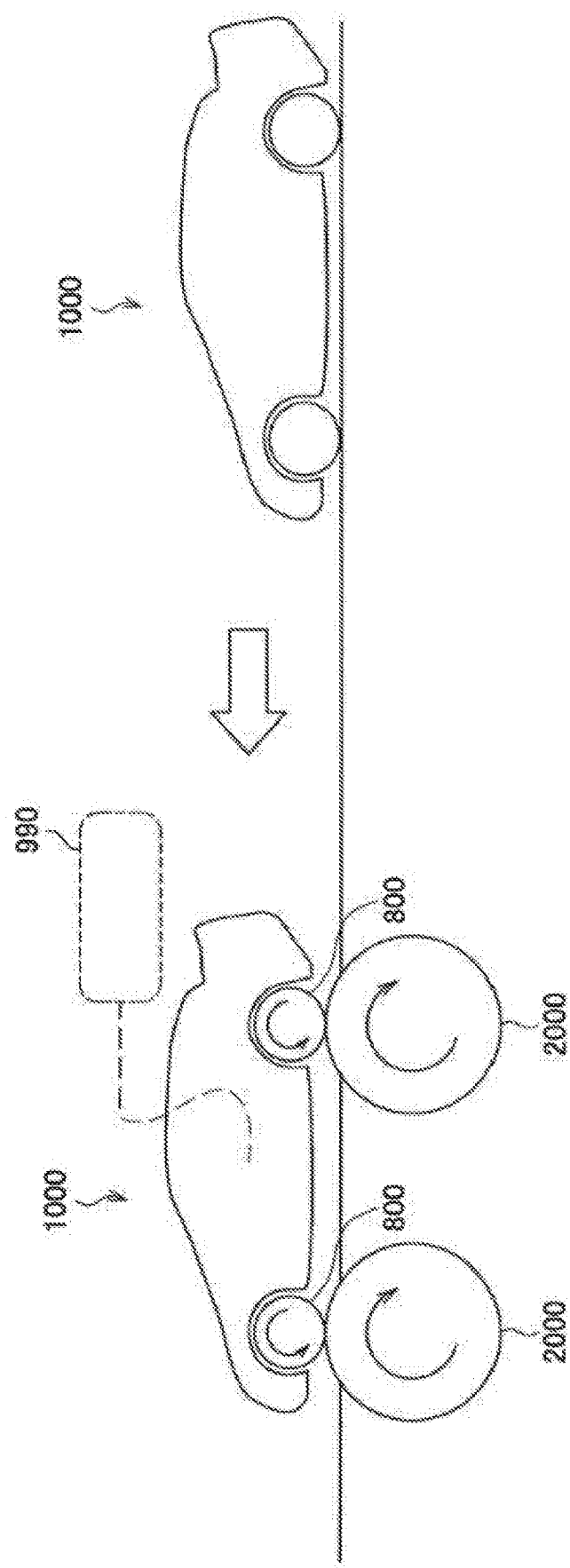
FIG. 3 is a schematic diagram illustrating a situation of an inertia moment measuring process applicable to a case where the vehicle is manufactured in a factory.

After manufactured in a factory, for example, the vehicle 1000 according to the example embodiment and configured as described above may undergo, before shipping, various measurements by rotating the tires 800 on a drum 2000, i.e., a chassis dynamo. FIG. 3 is a schematic diagram illustrating a situation where the vehicle 1000 is placed on the drum 2000 to perform measurements. In the example embodiment, for example, the vehicle 1000 may be driven on the drum 2000, and various parameters may be acquired. An inertia moment about each of the tires 800 may thus be calculated. In one embodiment, the inertia moment about each of the tires 800 may serve as an "inertia moment of a rotating system including the wheels". In the example embodiment, the inertia moment of the rotating system including the wheels may not be limited to the inertia moment about each of the tires 800, but may include inertia moments of, other than the tires 800, rotating members that rotate as the vehicle travels, such as the brake disk 500.

To perform measurements, a measuring apparatus 990 may be coupled to the vehicle 1000. Calculation of the inertia moment I, described below, may be performed by the control apparatus 900 of the vehicle 1000, or by the measuring apparatus 990. In other words, the measuring apparatus 990 may include, as for calculation of the inertia moment I, a configuration similar to the configuration of the control apparatus 900, as illustrated in FIG. 2, i.e., similar to the configuration including the angular acceleration acquisition unit 910, the motor torque acquisition unit 920, the contact force acquisition unit 930, the frictional coefficient acquisition unit 940, the inertia moment calculator 950, the error detector 960, and the storage 970. In a case where the measuring apparatus 990 calculates the inertia moment I, the measuring apparatus 990 may perform a process of writing the calculated inertia moment I onto the control apparatus 900, i.e., onto the ROM, for example. In one embodiment, the ROM may serve as a "storage".

A shape, e.g., a radius, of the drum 2000, as well as a state of a surface of the drum 2000, may be kept beforehand to a constant state. Before shipping, the tires 800 are new. The tires may be predetermined in kind and may be attached to the vehicle 1000. This makes it possible to grasp beforehand a coefficient of friction μ in a case where each of the tires 800 comes into contact with the drum 2000.

In the example embodiment, a process may be performed. The process may include utilizing the coefficient of friction μ between each of the tires 800 and the drum 2000. The coefficient of friction μ may be available beforehand. The process may further include calculating the inertia moment I of the rotating system on the power transmission route from the motor generator 110 to the driving wheels. In a specific but non-limiting example, the power transmission route may be from a rotor of the motor generator 110 to the driving wheels. The process may still further include writing the calculated inertia moment I onto the storage 970 of the control apparatus 900.

An expression (1) given below may represent a relationship among the coefficient of friction a motor torque $T_{motor}$ applied from the motor generator 110 to the hub 410 or the tire 800, the inertia moment I from the rotor of the motor generator 110 to the tire 800, a rotational angular acceleration α of the motor generator 110, a tire radius r, and a contact force W.

$$\mu = |(T_{motor} - I \times \alpha)/(r \times W)| \quad (1)$$

In the example embodiment, before shipping from the factory, the vehicle 1000 may undergo measurements on the drum 2000 to calculate the inertia moment I on the basis of the expression (1). The coefficient of friction μ may be a coefficient of friction between the drum 2000 and each of the tires 800. A predetermined value or a specified value may be used as the coefficient of friction μ. The motor torque $T_{motor}$ may be obtained from characteristics of the motor generator 110 and a current value of the motor generator 110. The current value may be detected by the current sensor 120. The rotational angular acceleration α may be obtained from a detection value of the rotation angle sensor 130 or an encoder that detects a rotation angle of the motor generator 110. The tire radius r may be determined beforehand on the basis of specifications of the vehicle 1000. The contact force W may be detected by the detector 420. The contact force W may correspond to the vertical force Fz described above. Note that the contact force W may be obtained from a load sensor provided to the drum 2000. The load sensor may detect a load in the vertical direction.

By assigning the parameters into the expression (1), it is possible to obtain the inertia moment I on the basis of the expression (1). The calculated inertia moment I may be written onto the storage 970 of the control apparatus 900. As a modification example to the measuring apparatus according to the example embodiment, the calculated inertia moment I may be written onto and stored in a separate storage apparatus from the control apparatus 900. The storage apparatus may be provided on the vehicle. Note that, as another example embodiment, in a case where the measuring apparatus 990 calculates the inertia moment I, the inertia moment I calculated by the measuring apparatus 990 may be sent to the vehicle 1000 and may be stored in the storage 970.

As described above, calculating the inertia moment I and storing the inertia moment I in the vehicle 1000 before the vehicle 1000 is shipped makes it possible to precisely perform various kinds of control on the vehicle 1000 on the basis of the inertia moment I. For example, accurately reflecting the inertia moment I of hardware including a motor that differs in kind per vehicle to perform control may be highly important for achieving safe vehicle control. Even with hardware including a motor that is identical in kind to motors of other hardware, the inertia moment I may differ as a result of variation based on individual differences. Grasping the inertia moment I per vehicle may therefore be still important, and may at least be useful.

In general, it may be difficult to accurately calculate the coefficient of friction μ during driving of the vehicle 1000.

Since it is possible to grasp beforehand the coefficient of friction μ between each of the tires 800 and the drum 2000, the example embodiment makes it possible to accurately obtain the inertia moment I on the basis of the expression (1). It is therefore possible to accurately control the vehicle on the basis of the inertia moment I.

In a specific but non-limiting example, obtaining the inertia moment I and storing the inertia moment I in the vehicle 1000 makes it possible to calculate an actual coefficient of friction μact during traveling, by acquiring the parameters other than the coefficient of friction μ for the expression (1), and assigning the parameters and the inertia moment I in the expression (1) during actual traveling of the vehicle 1000. It is therefore possible to optimally control the vehicle 1000 on the basis of the coefficient of friction μact acquired during traveling.

The inertia moment I may be calculated with another method, instead of using the expression (1). In a case where $I_{drum}$ represents an inertia moment of the drum 2000, and β represents an angular acceleration of the drum 2000, an expression (2) given below may be satisfied. Obtaining beforehand the inertia moment $I_{drum}$ of the drum 2000, and detecting the angular acceleration β with a rotation angle sensor of the drum 2000 during driving of the vehicle 1000 on the drum 2000 also makes it possible to obtain the inertia moment I with the expression (2).

$$I_{drum} \times \beta = T_{motor} - I \times \alpha \quad (2)$$

Furthermore, in a case where zero balance has been attained during calibration, a value of Fz representing W may be determined on the basis of an expression (3) given below. The value may be used as a reference value BaseFz. The reference value BaseFz may be written onto the control apparatus 900. In here, in a case where a sensor has been zero-balanced, i.e., an absolute value of a vertical load of W is not known, a current load may be obtained from Fx. As a precondition at this time, conditions such as that no slippage occurs may be used.

$$Fx = W \times \mu \quad (3)$$

By using Fz that may be acquired from the detector 420 during measurement and that may change, it is possible to represent the contact force W with an expression (4) given below.

$$W = Fz + BaseFz \quad (4)$$

Figure 4:
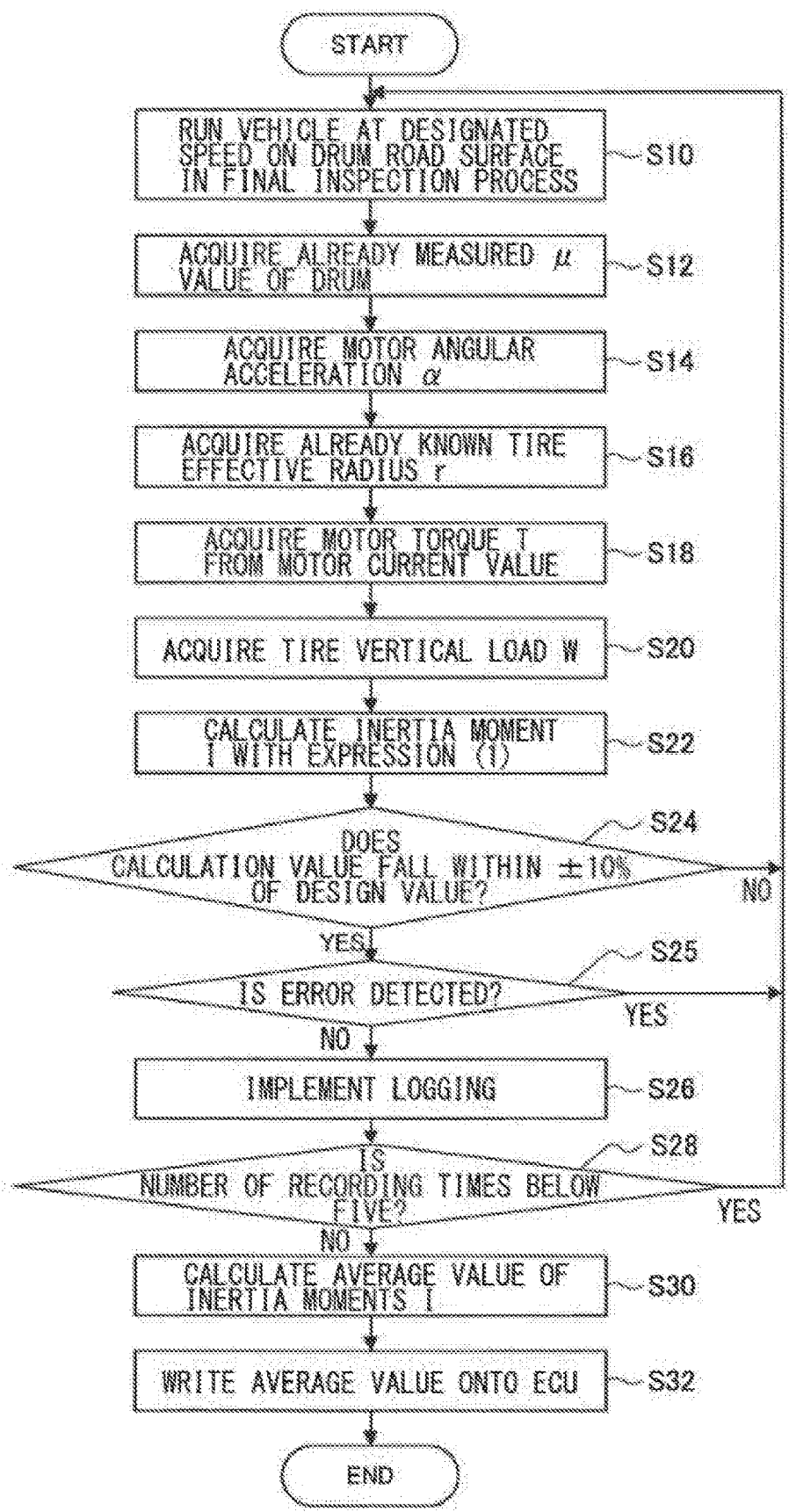
FIG. 4 is a flowchart illustrating a process of calculating an inertia moment I.

Next, a process of calculating the inertia moment I will be described with reference to the flowchart of FIG. 4. In the example embodiment, the process in FIG. 4 may be executed by the control apparatus 900 at predetermined control cycles. In a case where the measuring apparatus 990 mainly executes the process in FIG. 4, as another example embodiment, the measuring apparatus 990 may execute steps other than step S10, whereas the control apparatus 900 may execute step S10.

At step S10, the tires 800 may first be placed on the drum 2000 in a final inspection process of manufacturing the vehicle 1000. The vehicle 1000 may be allowed to travel at a designated speed. In a specific but non-limiting example, the vehicle 1000 may be accelerated or decelerated during traveling. The control apparatus 900 may output an instruction causing the motor generator 110 to output a torque in accordance with the acceleration or the deceleration. At next step S12, the frictional coefficient acquisition unit 940 may acquire the coefficient of friction μ of the drum 2000. The coefficient of friction μ may be measured beforehand. At next step S14, the angular acceleration acquisition unit 910 may acquire the angular acceleration α of the motor generator 110.

At next step S16, the effective radius r of each of the tires 800 may be acquired. The effective radius r may be known beforehand. At next step S18, the motor torque acquisition unit 920 may acquire the motor torque $T_{motor}$.

Note that it is possible to obtain the motor torque $T_{motor}$ from the characteristics of the motor generator 110 and a current value of the current sensor 120. At next step S20, the contact force acquisition unit 930 may acquire from the detector 420 a tire vertical load, i.e., the contact force W. At next step S22, the inertia moment calculator 950 may calculate the inertia moment I with the expression (1).

At next step S24, it may be determined whether the inertia moment I, i.e., a calculation value, calculated at step S22 falls within a range of ±10% of a design value. In a case where the calculation value of the inertia moment I falls within the range of ±10% of the design value (YES in step S24), the process may proceed to step S25. In a case where, on the other hand, the calculation value of the inertia moment I is outside of the range of ±10% of the design value (NO in step S24), the inertia moment I calculated at the control cycle may not be recorded. The process may return to step S10.

At step S25, the error detector 960 may determine whether an error is detected during measurement on the drum 2000. Error determinations may take place with two methods described below. In a first error determination, it may be determined whether each of the tires 800 and the drum 2000 rotate at a constant slip ratio during measurement. In other words, it may be determined whether a rotational distance through rotation of the drum 2000 has a constant ratio with respect to a travel distance of each of the tires 800. A travel distance of each of the tires 800 may be obtained from a number of rotations and a radius of each of the tires 800. A rotational distance through rotation of the drum 2000 may be obtained from a number of rotations and a radius of the drum 2000.

In a case where a ratio of a rotational distance of the drum 2000 with respect to a travel distance of each of the tires 800 has a value ranging from approximately 0.8 to approximately 0.9, for example, it may be determined that no error has occurred.

In a case where, on the other hand, a ratio of a rotational distance of the drum 2000 with respect to a travel distance of each of the tires 800 is outside of the range from approximately 0.8 to approximately 0.9, e.g., in a case where the ratio described above is below the range of approximately 0.8 to approximately 0.9, it may be determined that a constant or greater slippage has occurred between each of the tires 800 and the drum 2000. In this case, it may be determined that an error has occurred. One example reason for the slippage may be a variation in coefficient of friction of a contact surface between each of the tires 800 and the drum 2000 due to a change in temperature, for example. In such a case, it may therefore be determined that an error is detected. Detecting an error as described above makes it possible to allow a calculation condition for the inertia moment I to be rigorous, improving precision in calculating the inertia moment I. In one embodiment, the first error determination may be implemented by a "first error detector".

Figure 5:
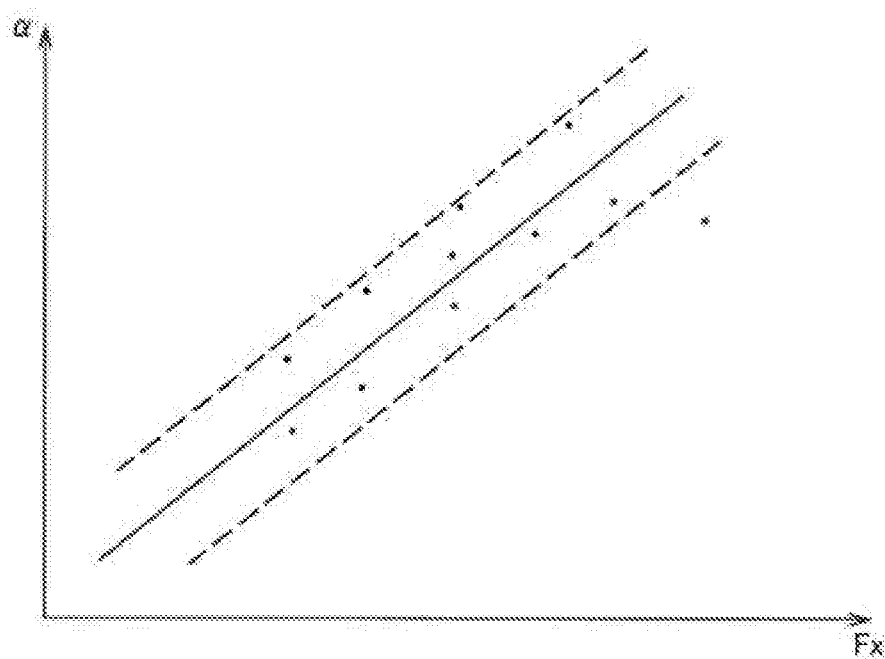
FIG. 5 is a characteristic diagram illustrating a relationship between a longitudinal force Fx and an angular acceleration α.

As a second error determination, an error may be determined on the basis of a relationship between the longitudinal force Fx detected by the detector 420 and the angular acceleration α of the drum 2000. FIG. 5 is a characteristic diagram illustrating a relationship between the longitudinal force Fx and the angular acceleration a. As described above, the vehicle 1000 may be accelerated or decelerated during measurement on the drum 2000 to calculate the inertia moment I with the expression (1). At this time, there may be by nature a linear relationship between the longitudinal force Fx detected by the detector 420 and the angular acceleration α of the drum 2000, as illustrated by a solid line in FIG. 5, on the basis of a motion equation. The error detector 960 may sequentially plot, during measurement, the longitudinal force Fx and the angular acceleration α, as illustrated in FIG. 5. For example, in a case where a plot lies outside of dashed lines illustrated in FIG. 5, it may be determined that the longitudinal force Fx detected by the detector 420 has an abnormal value. In one embodiment, the second error determination may be implemented by a "second error detector".

This makes it possible to secure accuracy in detection by the detector 420. This also makes it possible to secure correctness between the longitudinal force Fx and the vertical force Fz. As a result, it is possible to improve precision in calculating the inertia moment I. In other words, it is possible to not only calculate the inertia moment I, but also detect a malfunction or a calibration error in the detector 420.

In a case where an error is detected at step S25 (YES in step S25), the inertia moment I calculated at the cycle may not be recorded. The process may return to step S10. That is, the inertia moment I calculated at the cycle may be discarded. In a case where no error is detected at step S25 (NO in step S25), the process may proceed to step S26.

At step S26, the inertia moment I calculated at step S22 may be recorded, i.e., logging may be implemented. At next step S28, it may be determined whether a number of recording times at step S26 is less than five times. In a case where the number of recording times is less than five times (YES in step S28), the process may return to step S10. In a case where the number of recording times reaches five times (NO in step S28), the process may proceed to step S30. At step S30, an average value of the recorded five inertia moments I may be calculated. At next step S32, the average value calculated at step S30 may be written onto the control apparatus 900. In a specific but non-limiting example, the average value calculated at step S30 may be written onto the storage of the control apparatus 900.

For example, the control apparatus 900 may acquire, during actual traveling, the parameters other than the coefficient of friction μ for the expression (1). The control apparatus 900 may assign, in the expression (1), the parameters and the stored inertia moment I. The control apparatus 900 may thus calculate the actual coefficient of friction μact during traveling. On the basis of the coefficient of friction μact acquired during traveling, control parameters regarding behavior of the vehicle 1000 may be adjusted to control a driving force of the vehicle 1000, for example.

Accurately grasping an inertia moment of a rotating system including wheels may be important to properly control behavior of a vehicle. Strictly speaking, an inertia moment of a rotating system may not be identical among all vehicles. For not only vehicles including different rotational parts, but also vehicles including identical rotational parts, an inertia moment may differ per vehicle due to variations in the parts and respective assembly states, for example. Therefore, an inertia moment may be grasped per vehicle, for example. There may be such a technology that allows a vibration input portion to input predetermined vibrations to tires to acquire frequency information of the tires to calculate an inertia moment or an outside inertia moment, in a specific but non-limiting example, of each of the tires from the acquired frequency information. This technology may demand such a vibration input portion that inputs vibrations to tires. Achieving, as simple as possible, a configuration that makes it possible to calculate an inertia moment may be advantageous in terms of not only the configuration, but also saving a cost.

According to the example embodiment, a torque and an angular acceleration of the motor generator 110 may be acquired. A contact force of each of the wheels or the tires 800 may be acquired as well. The inertia moment I of the rotating system including the wheels may be calculated on the basis of, in addition to the torque and the angular acceleration of the motor generator 110 and the contact force of each of the wheels, a coefficient of friction between each of the wheels and a contact surface. This makes it possible to calculate the inertia moment I about each of the tires 800 per vehicle, with a relatively simple configuration. In a specific but non-limiting example, as for the inertia moment I of the rotating system including parts linked to each of the tires 800, i.e., including the motor generator 110 or a core, the hubs 400 and 410, the wheel 700, and the tire 800, it is possible to obtain the inertia moment I per vehicle without performing measurements on each part. In other words, as for the inertia moment I of the whole rotating system on the power transmission route from the motor generator 110 serving as a drive source to the wheel or the tire 800, it is possible to obtain the inertia moment I per vehicle without performing measurements on each part.

Furthermore, the example embodiment may be provided with the storage 970 and the controller 980. The storage 970 may be included in the control apparatus 900, for example. The storage 970 may include the inertia moment I of the rotating system stored therein. The inertia moment I may be calculated by the method described above. The controller 980 may control behavior of the vehicle on the basis of the inertia moment I stored in the storage 970. This makes it possible to reflect the calculated inertia moment I in control of the vehicle, e.g., control of a driving force of the vehicle, making the control of the vehicle highly precise.

Some example embodiments of the disclosure have been described in detail with reference to the accompanying drawings. However, the disclosure is not limited to the example embodiments. It is apparent that persons skilled in the technical field of the disclosure may perceive various modification examples or correction examples within the scope of the technical concept as defined by the following claims. It should be appreciated that the various modification examples or correction examples obviously fall within the technical scope of the disclosure.

The disclosure makes it possible to calculate an inertia moment of a rotating system including wheels with a simple configuration.

The control apparatus 900 and the measuring apparatus 990 illustrated in FIGS. 1 to 3 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control apparatus 900 and the measuring apparatus 990. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the control apparatus 900 and the measuring apparatus 990 illustrated in FIGS. 1 to 3.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. An assembly method for a vehicle, the vehicle comprising:
   a rotating system comprising a core of a motor and a wheel to be driven by the motor;
   a detector configured to acquire a contact force of the wheel;
   a storage configured to store information that indicates an inertia moment of the rotating system; and
   a control apparatus configured to i) acquire a torque of the motor and an angular acceleration of the motor, ii) calculate a coefficient of friction between the wheel and a contact surface based on the torque of the motor, the angular acceleration of the motor, the contact force of the wheel and the stored information, and iii) perform control regarding a driving force of the vehicle based on the calculated coefficient of friction,
   the assembly method for the vehicle comprising:
      assembling the rotating member, the detector, the storage and the control apparatus to a body of the vehicle in a factory so that the assembled vehicle is able to travel;
      measuring, while the assembled vehicle is driven on a drum of a chassis dynamo placed at the factory, the torque of the motor, the angular acceleration of the motor and the contact force of the wheel,
      calculating the inertia moment of the rotating system of the assembled vehicle based on the measured torque of the motor, the measured angular acceleration of the motor, the measured contact force of the wheel and a predetermined coefficient of friction between the wheel and the drum,
      storing the calculated inertia moment in the storage of the assembled vehicle on which the measuring was made as the information; and
      shipping the assembled vehicle in which the calculated inertia moment is stored in the storage as the information from the factory.

2. The assembly method for the vehicle according to claim 1, further comprising:
   detecting, during the measuring, a first error based on a ratio of a rotational distance of the drum with respect to a travel distance of the wheel in a case where the ratio is outside of a first predetermined range; and
   discarding the calculated inertia moment before the storing in a case where the first error is detected.

3. The assembly method for the vehicle according to claim 2, further comprising:

detecting, during the measuring, a second error based on a relationship between an angular acceleration of the drum and a longitudinal force that is applied to the wheel in a case where a ratio of the angular acceleration of the drum with respect to the longitudinal force is outside of a second predetermined range while the measuring is being performed; and discarding the calculated inertia moment before the storing in a case where the second error is detected.

4. The assembly method for the vehicle according to claim 3, further comprising:

detecting, based on the calculated inertia moment and a predetermined design value of an inertia moment of the rotating system, a third error in a case where a ratio of the calculated inertia moment with respect to the predetermined design value is outside of a third predetermined range; and discarding the calculated inertia moment before the storing in a case where the third error is detected.

5. The assembly method for the vehicle according to claim 2, further comprising:

detecting, based on the calculated inertia moment and a predetermined design value of an inertia moment of the rotating system, a third error in a case where a ratio of the calculated inertia moment with respect to the predetermined design value is outside of a third predetermined range; and discarding the calculated inertia moment before the storing in a case where the third error is detected.

6. The assembly method for the vehicle according to claim 1, further comprising:

detecting, during the measuring, a second error based on a relationship between an angular acceleration of the drum and a longitudinal force that is applied to the wheel in a case where a ratio of the angular acceleration of the drum with respect to the longitudinal force is outside of a second predetermined range; and discarding the calculated inertia moment before the storing in a case where the second error is detected.

7. The assembly method for the vehicle according to claim 6, further comprising:

detecting, based on the calculated inertia moment and a predetermined design value of an inertia moment of the rotating system, a third error in a case where a ratio of the calculated inertia moment with respect to the predetermined design value is outside of a third predetermined range; and discarding the calculated inertia moment before the storing in a case where the third error is detected.

8. The assembly method for the vehicle according to claim 1, further comprising:

detecting, based on the calculated inertia moment and a predetermined design value of an inertia moment of the rotating system, a third error in a case where a ratio of the calculated inertia moment with respect to the predetermined design value is outside of a third predetermined range; and discarding the calculated inertia moment before the storing in a case where the third error is detected.

9. The assembly method for the vehicle according to claim 1, wherein the storage is configured to store the predetermined coefficient of friction between the wheel and the drum, and wherein the control apparatus of the vehicle is configured to i) calculate the inertia moment of the rotating system and ii) store the calculated inertia moment in the storage as the information.

10. The assembly method for the vehicle according to claim 9, wherein the control apparatus of the vehicle is configured to:

detect, based on a ratio of a rotational distance of the drum with respect to a travel distance of the wheel, a first error in a case where the ratio is outside of a first predetermined range while the measuring is being performed; and discard the calculated inertia moment before the storing in a case where the first error is detected.

11. The assembly method for the vehicle according to claim 10, wherein the control apparatus of the vehicle is configured to:

detect, during the measuring, a second error based on a relationship between an angular acceleration of the drum and a longitudinal force that is applied to the wheel in a case where a ratio of the angular acceleration of the drum with respect to the longitudinal force is outside of a second predetermined range; and discard the calculated inertia moment before the storing in a case where the second error is detected.

12. The assembly method for the vehicle according to claim 11, wherein the control apparatus of the vehicle is configured to:

detect, based on the calculated inertia moment and a predetermined design value of an inertia moment of the rotating system, a third error in a case where a ratio of the calculated inertia moment with respect to the predetermined design value is outside of a third predetermined range; and discard the calculated inertia moment before the storing in a case where the third error is detected.

13. The assembly method for the vehicle according to claim 10, wherein the control apparatus of the vehicle is configured to:

detect, based on the calculated inertia moment and a predetermined design value of an inertia moment of the rotating system, a third error in a case where a ratio of the calculated inertia moment with respect to the predetermined design value is outside of a third predetermined range; and discard the calculated inertia moment before the storing in a case where the third error is detected.

14. The assembly method for the vehicle according to claim 9, wherein the control apparatus of the vehicle is configured to:

detect, during the measuring, a second error based on a relationship between an angular acceleration of the drum and a longitudinal force that is applied to the wheel, in a case where a ratio of the angular acceleration of the drum with respect to the longitudinal force is outside of a second predetermined range; and discard the calculated inertia moment before the storing in a case where the second error is detected.

15. The assembly method for the vehicle according to claim 14, wherein the control apparatus of the vehicle is configured to:

detect, based on the calculated inertia moment and a predetermined design value of an inertia moment of the rotating system, a third error in a case where a ratio of the calculated inertia moment with respect to the predetermined design value is outside of a third predetermined range; and discard the calculated inertia moment before the storing in a case where the third error is detected.

16. The assembly method for the vehicle according to claim 9, wherein the control apparatus of the vehicle is configured to:
- detect, based on the calculated inertia moment and a predetermined design value of an inertia moment of the rotating system, a third error in a case where a ratio of the calculated inertia moment with respect to the predetermined design value is outside of a third predetermined range; and
- discard the calculated inertia moment before the storing in a case where the third error is detected.

* * * * *